US007725849B2

(12) United States Patent
Abercrombie et al.

(10) Patent No.: US 7,725,849 B2
(45) Date of Patent: May 25, 2010

(54) FEATURE FAILURE CORRELATION

(75) Inventors: David Abercrombie, Sherwood, OR (US); Bernd Karl Ferdinand Koenemann, San Jose, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 11/242,633

(22) Filed: Oct. 3, 2005

(65) Prior Publication Data
US 2007/0143718 A1    Jun. 21, 2007

Related U.S. Application Data

(60) Provisional application No. 60/615,329, filed on Oct. 1, 2004.

(51) Int. Cl.
G06F 17/50     (2006.01)
G06F 19/00     (2006.01)
G01R 31/02     (2006.01)
G01R 31/28     (2006.01)
G01F 11/22     (2006.01)

(52) U.S. Cl. .................. 716/4; 703/16; 702/59; 702/117; 714/25; 714/724; 710/110

(58) Field of Classification Search ............ 716/4; 703/16; 702/59, 117; 714/25, 724; 324/557, 324/724; 700/110
See application file for complete search history.

(56) References Cited

U.S. PATENT DOCUMENTS

| | | | | |
|---|---|---|---|---|
| 5,539,652 | A * | 7/1996 | Tegethoff ..................... 703/14 |
| 5,754,432 | A * | 5/1998 | Komatsuzaki et al. ........ 700/110 |
| 5,777,901 | A | 7/1998 | Berezin et al. |
| 6,516,433 | B1 * | 2/2003 | Koenig ........................ 714/737 |
| 6,567,946 | B1 * | 5/2003 | Nozuyama .................... 714/741 |
| 7,441,168 | B2 * | 10/2008 | Yoshida et al. ................ 714/724 |
| 7,594,206 | B2 * | 9/2009 | Yoshida et al. .................. 716/4 |
| 7,610,168 | B2 * | 10/2009 | Isumi et al. ................... 702/179 |
| 2003/0028352 | A1 | 2/2003 | Puthucode |
| 2004/0138852 | A1 | 7/2004 | Everts et al. |
| 2004/0187050 | A1 * | 9/2004 | Baumann et al. ............. 714/704 |
| 2004/0255198 | A1 * | 12/2004 | Matsushita et al. ............ 714/37 |
| 2005/0278666 | A1 * | 12/2005 | Diamond ....................... 716/4 |

(Continued)

OTHER PUBLICATIONS

"Predictive Yield Modeling of VLSIC's" by Dennis J. Ciplickas et al., Statistical Metrology, 2000 5th International Workshop on Jun. 11, 2000, Piscataway, N.J., IEEE, 2000, pp. 28-37.

(Continued)

*Primary Examiner*—Phallaka Kik

(57) ABSTRACT

Techniques are disclosed for determining the likelihood that a known feature in an integrated circuit design will cause a defect during the manufacturing process. According to some of these techniques, various logical units that incorporate an identified design feature are identified, and the amount that the design feature occurs in each of a plurality of these logical units is determined. The failure rate of integrated circuit portions corresponding to at least these logical units are then obtained. A feature failure coefficient indicating the likelihood that the feature will cause a defect then is determined by correlating the failure rates with the amount of occurrences of the feature.

50 Claims, 11 Drawing Sheets

U.S. PATENT DOCUMENTS

2006/0053357 A1* 3/2006 Rajski et al. ................ 714/742
2006/0066339 A1 3/2006 Rajski et al.
2006/0236184 A1* 10/2006 Yoshida et al. .............. 714/737

OTHER PUBLICATIONS

"Value-Added Defect Testing Techniques," by Jahangiri, J. and Abercrombie, D., Design & Test of Computers, IEEE, vol. 22, Issue 3, May-Jun. 2005, pp. 224-231.

"Meeting Nanometer DPM Requirements Through DFT," by Jahangiri, J. and Abercrombie. D., Quality of Electronic Design, 2005, ISQED 2005, Sixth International Symposium On, 21-23.

"Enhancing Manufacturing Test and Yield in the Nanometer Era," by R. Press and. J. Ferguson, Semiconductor Manufacturing, vol. 5, No. 8, Aug. 2004, pp. 38-44.

"Rethinking Test At 130 Nanometers And Below," by S. Cook, EE Times, Sep. 12, 2003, hftp://www.eetimes.com/news/design/showArticle.jhtml?articielD=17408660, 5 pages.

"High-Frequency, At-Speed Scan Testing," by Xijiiang Lin et al., Design & Test of Computers, IEEE, vol. 20, Issue 5, Sept.-Oct. 2003 pp. 17-25.

"Compactor Independent Direct Diagnosis," by Wu-Tung Cheng et al., Test Symposium, 2004. 13th Asian, Nov. 15-17, 2004, pp. 204-209.

International Search Report and Written Opinion for PCT/US2005/035422, mailed on Jun. 29, 2006.

European Patent Office written opinion, for application No. 05-803-198.0-2224 mailed Jul. 16, 2007.

* cited by examiner

FEATURE FAILURE CORRELATION

RELATED APPLICATIONS

This application claims priority to U.S. Provisional Patent Application No. 60/615,329, filed on Oct. 1, 2004, entitled "Meeting Nanometer DPM Requirements Through DFT," naming David Abercrombie et al. as inventors, which application is incorporated entirely herein by reference.

FIELD OF THE INVENTION

The present invention relates to various techniques and tools to assist in the design of integrated circuits. Various aspects of the present invention are particularly applicable to the use of test data to determine the physical features of an integrated circuit that are most likely to cause the integrated circuit to fail.

BACKGROUND OF THE INVENTION

Microcircuit devices, commonly referred to as "integrated circuits," are used in a variety of products, from automobiles to microwaves to personal computers. Designing and fabricating integrated circuits involves many steps; which has become known as a 'design flow,' the particular steps of which are highly dependent on the type of microcircuit, the complexity, the design team, and the integrated circuit fabricator or foundry. Several steps are common to all design flows: first a design specification is modeled logically, typically in a hardware design language (HDL). Software and hardware "tools" then verify the design at various stages of the design flow by running software simulators and/or hardware emulators, and errors are corrected in the design are corrected.

After the accuracy of the logical design is confirmed, the logical design is converted into design data by synthesis software. The design data, often called a "netlist", represents the specific electronic devices that will achieve the desired logical result, such as transistors, resistors, and capacitors, and their interconnections. Preliminary estimates of timing may also be made at this stage, using an assumed characteristic speed for each device. This "netlist" can be viewed as corresponding to the level of representation displayed in typical circuit diagrams.

Once the relationships between circuit elements have been established, the design is again transformed into physical design data describing specific geometric elements. These geometric elements define the shapes that will be created in various materials to form the circuit elements. Custom layout editors, such as Mentor Graphics' IC Station or Cadence's Virtuoso are commonly used for this task. Automated place and route tools can also be used to define the physical layouts, especially of wires that will be used to interconnect logical elements.

Thus, the physical design data represents the patterns that will be written onto the masks used to fabricate the desired microcircuit device, typically by photolithographic processes. Each layer of the integrated circuit has a corresponding layer representation in the physical database, and the geometric shapes described by the data in that layer representation define the relative locations of the circuit elements. For example, the shapes for the layer representation of an implant layer define the regions where doping will occur; the line shapes in the layer representation of an interconnect layer define the locations of the metal wires to connect elements, etc. A manufacturing facility or "fab" will then manufacture the integrated circuits using the masks. Each fab specifies its own physical design parameters for compliance with their process, equipment, and techniques.

As the importance of microcircuit devices grow, designers and manufacturers continue to improve these devices. Each year, for example, microcircuit device manufacturers develop new techniques that allow microcircuit devices, such as programmable microprocessors, to be more complex and smaller in size. Microprocessors are now manufactured with over 50 million transistors, many with dimensions of only 90 nm. As microcircuit devices become more complex and their circuit elements smaller, they also become more difficult to correctly manufacture. For example, a conventional microcircuit device may have millions of different connections, and even a single broken or shorted connection may cause the operation of the microcircuit to fail.

Increasing the manufacturing yield of an integrated circuit by reducing the number of defects created during the manufacturing process traditionally has been the responsibility of the fabs that manufacture the integrated circuits. Typically, a fab will identify defects after an initial manufacturing run, and then make changes in the manufacturing process or equipment for subsequent manufacturing runs in the hope of avoiding the identified defects and improving the manufacturing yield of the integrated circuit. The complexity of the design and manufacturing process for modern integrated circuits constructed at nanometer geometries has led to a dramatic rise in the number of defects that occur only as a result of the interaction between the design and the process, however. As a result, it has become increasingly difficult for a fab to identify changes in the process or equipment that will reduce these new types of defects. In many cases these new defect types are too difficult or costly to even detect during the manufacturing process.

BRIEF SUMMARY OF THE INVENTION

Advantageously, embodiments of the invention provide techniques for determining the likelihood that a known feature in an integrated circuit design will cause a defect during the manufacturing process. More particularly, some implementations of the invention identify various logical units that incorporate an identified design feature, and determine the amount that the design feature occurs in each of a plurality of these logical units. These implementations also then obtain the failure rate of integrated circuit portions corresponding to at least these logical units. A feature failure coefficient indicating the likelihood that the feature will cause a defect then is determined by correlating the failure rates with the amount of occurrences of the feature.

Some implementations of the invention can additionally be used to identify new design features that are more likely to cause a defect. With these examples of the invention, the failure rates for logical units are predicted based upon the amount of the known features occurring in each of the logical units and their predicted impact upon the yield of portions of an integrated circuit corresponding to these logical units. These predicted failure rates are then compared with the actual failure rates of integrated circuit portions corresponding to the logical units, and the portions having the largest discrepancy are identified. One or more of these integrated circuit portions can then be examined using, for example, failure analysis testing, to physically identify the structural defects that caused the portions to fail. When the testing discovers a structural defect that does not correspond to a known feature, the design feature describing the defect is identified. The failure rate probability value can then be determined for this newly identified feature. This process may be repeated until the predicted failure rates for the logical units sufficiently match the actual failure rates of their corresponding integrated circuit portions.

Accordingly, various examples of the invention can be used to identify those features in an integrated circuit design will have the largest impact on the manufacturing yield of the integrated circuit. Based upon this information, a designer may revise an integrated circuit design to reduce or avoid the use of those design features that will be more likely to reduce the yield of integrated circuits manufactured from the design.

DETAILED DESCRIPTION OF THE INVENTION

Overview

Figure 1:
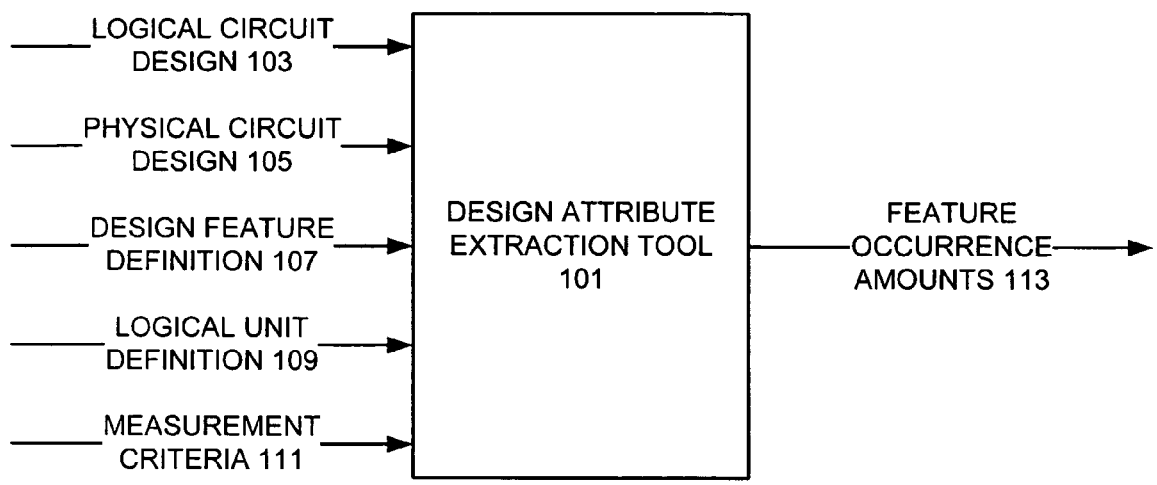
FIG. 1 illustrates an example of a design attribute extraction tool that may be employed by various examples of the invention.

Different embodiments of the invention provide techniques for determining the likelihood that a designated feature in an integrated circuit design will cause a defect during the manufacturing process. Some implementations of the invention may also identify one or more additional, previously unrecognized design features that are likely to cause a defect. Thus, using various examples of the invention, a designer can identify those features in an integrated circuit design that will have the largest impact on the manufacturing yield of the integrated circuit. A designer can then use this information to modify an integrated circuit design to reduce or avoid the use of design features that will be more likely to reduce the yield of integrated circuits manufactured from the design.

According to various embodiments of the invention, a designer initially will specify a design feature for analysis by a feature failure correlation tool. Using, for example, information provided by a separate design attribute identification tool, the feature failure correlation tool will identify various logical units in one or more integrated circuit designs that incorporate the specified design feature. As will be discussed in more detail below, a logical unit is some hierarchical subset of an integrated circuit design that corresponds to available test information. The feature failure correlation tool also will determine the amount of occurrences of the specified design feature in each logical unit. Additionally, the feature failure correlation tool will determine the failure rate of portions of actual integrated circuits corresponding to some or all of the logical units. This information may, for example, be obtained from a separate test information tool.

Next, the feature failure correlation tool will correlate the failure rates of the integrated circuit portions units to the amount of occurrences of the feature in each corresponding logical unit to determine a failure coefficient for the feature. This feature failure coefficient then will reflect the yield rate of an integrated circuit based upon the amount that the feature occurs in the design of the integrated circuit. The feature failure coefficient can be stored in a database for future use. With some implementations of the invention, the feature failure correlation tool may alternately or additionally display the relative sizes of the yield impacts associated with feature failure coefficients for different features using, e.g., a Pareto chart. A designer can thus use the relative sizes of the yield impacts associated with the feature failure coefficients to determine which features in an integrated circuit design will have the biggest impact on the yield of integrated circuits manufactured from the design.

Some examples of the invention may additionally be used to discover unknown features in an integrated circuit design that will significantly impact the yield of an integrated circuit. These embodiments may provide, for example, a feature identification tool that incorporates some or all of a feature failure correction tool according to the invention. The feature identification tool uses previously-determined feature failure coefficients for known features to predict the failure rate of various logical units. The feature identification tool then compares the predicted failure rates with the actual failure rates, to determine the integrated circuit portion with the largest failure rate discrepancy, and identifies this integrated circuit portion for further analysis.

For example, the feature identification tool may identify the integrated circuit portion with the largest failure rate discrepancy to a failure analysis tool for physical testing. This maximizes the likelihood that a physical defect discovered by the failure analysis test tool will not have been caused a design feature with a known failure coefficient, but will instead have been caused by a previously unrecognized design feature. When a failure analysis tool discovers a defect that has been caused by a previously unrecognized design feature, this new design feature can be identified and processed by the feature failure correlation tool to determine its feature failure coefficient. This process then can be repeated until every design feature that has a significant impact on an integrated circuit's yield is identified and its feature failure coefficient determined.

With some examples of the invention, the feature identification tool may analyze the difference between actual failure rates of the integrated circuit portions and the predicted failure rates, to determine the remaining yield impact associated with one or more unknown features. The feature identification tool may, for example, compare the size of this remaining impact with the yield impacts from known features in a Pareto chart. By comparing the discrepancy between the yield impact for one or more unknown features with the yield impacts of known design features, a user can determine whether to continue to identify previously unknown design features that impact the yield of an integrated circuit design.

Feature Extraction

As noted above, various examples of the invention employ information identifying one or more logical units that incorporate a specified design feature, and the amount of occurrences of the specified design feature in each logical unit. As used herein, a design feature may be any attribute or group of attributes in an integrated circuit design that corresponds to a physical structure in an integrated circuit manufactured from the design. For example, a design feature may describe a via between two metal layers, a connective metal line, a connective metal line of a specific length, a particularly-shaped connection (e.g., an "L"-shaped connection), a pair of adjacent conductive lines, a via adjacent to a conductive line, a via adjacent to a conductive line and within a specific distance, etc. Thus, any physical structure that will be created by one or more attributes in an integrated circuit can be described by a design feature.

It also should be noted that a design feature may be defined using any type of desired classification. For example, a design feature can be defined using design-rule parameters, process model parameters (e.g., the specification of a light intensity), geometric descriptions (e.g., a lithographic print image), or one or more patterns for pattern matching. Thus, any technique that can be used to uniquely identify one or more attributes of an integrated circuit design corresponding to a physical structure can be used to define a design feature.

A logical unit may then be any desired hierarchical subset of an integrated circuit design. For example, the logical units may be the blocks that are used to form the integrated circuit design during a place-and-route process. A logical unit also may be a netlist used to generate the physical circuit elements during a synthesis process or a netlist pair. Still further, the logical unit may be a cone of logical circuit elements that feeds signals to or receives signals from a particular gate or flop, or even a group of logical circuit elements that are tested by a particular set of scan registers. An integrated circuit manufactured from the design will then have a physical portion described by the logical unit.

It should be noted that the particular types of logical units employed by the invention may be determined by the available test information. As will be explained in detail below, various examples of the invention correlate the failure rates of integrated circuit portions corresponding to the logical units with an amount of occurrences of a design feature. Thus, various embodiments of the invention will employ logical units for which testing information has accurately measured the failure rate. With some examples of the invention, the logical units employed to determine a feature failure coefficient will be of the same hierarchical level. Thus, the failure rate of a block will not be used in the same correlation process as the failure rate of a netlist. With still other examples of the invention however, logical units of different hierarchical levels that do not entirely overlap may be used together in the same correlation process.

With various embodiments of the invention, a user (i.e., a designer or other person employing the techniques of the invention) initially will specify a design feature for analysis. One of ordinary skill in the art will appreciate that some structures, such as small vias and long conductive wires, will be more likely to fail than other structures. Accordingly, the user will specify a design feature defining a structure that has a relatively high likelihood of failure.

Next, the user will identify a plurality of logical units for which there is test information obtained through failure analysis techniques. With some examples of the invention, the logical units may be limited to logical units that incorporate at least one occurrence of the specified design feature to reduce noise during the correlation process. Further, for each logical unit, the user will determine the amount of occurrences of the specified design feature it incorporates. Both the logical units and the amount of occurrences of the specified design feature incorporated in each logical unit may be determined using, for example, a design attribute extraction tool. One example of such a design attribute extraction tool is the CALIBRE software product available from Mentor Graphics Corporation of Wilsonville, Oreg.

The operation of a design attribute extraction tool 101 is shown in FIG. 1. As seen in this figure, the design attribute extraction tool 101 receives one or more logical circuit designs 103, one or more corresponding physical circuit designs 105, a design feature definition 107 specifying the design feature, and a logical unit definition 109 defining the type of logical unit or units for which test information is available. From this input, the design attribute extraction tool 101 can determine a plurality of logical units that incorporate at least one occurrence of the specified design feature. It should be noted that the logical units may be derived from a single integrated circuit design, or from multiple different circuit designs. Thus, if a net incorporating the specified design feature (e.g., a net describing a memory register) has been employed in several different integrated circuits designs, each use of that net may be employed by the invention in the correlation process.

The design attribute extraction tool 101 also receives measurement criteria 111 for determining an amount of occurrences of the specified feature in a logical unit. The amount can be determined using any desired criteria, including the number of discrete occurrences, a frequency, a length, an area, or perimeter. For example, if the design feature defines a via, the amount of occurrences of the feature may be the number of discrete vias in the logical unit. On the other hand, if the design feature corresponds to adjacent conductive lines, then the amount of occurrences of this feature may be the length for which the lines are adjacent. Alternately, the amount of occurrences of this feature may be the distance between the lines.

For example, adjacent lines in one logical unit may be adjacent for a length of 12 microns, and separated by a distance of 1 micron. In another logical unit, the corresponding lines may be adjacent for only 3 microns, with a separation distance of 5 microns. If the occurrence of the feature amount is measured based upon the length of adjacency, the first logical unit might therefore have an occurrence amount of 12, while the second logical unit would then have an occurrence amount of 3. If, however, the feature occurrence amount is measured based upon the distance separating the lines, then the amount of occurrences in the first logical unit may be 1 and the amount of occurrences in the second logical unit would then be 5. Thus, it should be appreciated that the amount of occurrences can be measured using any desired criteria that may measure the relationship between the use of feature in a design and the likelihood that the feature will impact the yield of an integrated circuit manufactured from the design.

Based upon the logical circuit designs 103, the design feature definition 105, the logical unit definition 107 and the measurement criteria 109, the design attribute extraction tool 101 provides the feature occurrence amounts 113 for each logical unit incorporating the specified feature. With some embodiments of the invention, the use and operation of the design attribute extraction tool 101 will be incorporated into the implementation of the invention. For still other embodiments of the invention, however, the use and operation of the design attribute extraction tool 101 may be separate and independent from the implementation of the invention. For these embodiments, the feature failure correlation tool may simply receive the feature occurrence amounts 113 as raw data.

Test Diagnostics

As previously noted, the techniques employed by embodiments of the invention correlate the failure rates of logical units with the amount of occurrences of a design feature. The failure rates may be obtained using any conventional testing method. For example, the test information may be obtained from physical testing of integrated circuits. Alternately, the test information may be obtained by manufacturing "test" integrated circuits. A test integrated circuit does not perform any particular function. Instead, the test integrated circuit will simply include multiple instances of a single structure, such as a transistor or gate. Thus, test integrated circuits could be used to test multiple instances of a logical unit. Typically, however, these types of testing are too slow and costly to provide sufficient test information to accurately correlate the failure rate of multiple logical units.

Instead, various embodiments of the invention employ test information obtained from test circuitry embedded in integrated circuits.

This type of testing, sometimes referred to as embedded testing, employs chains of internal registers (such as flops) or "scan chains" to record the values at various gate and net locations during the operation of the integrated circuit. Thus, the scan chains may provide thousands of locations that detect the correct or incorrect operation of small portions of an integrated circuit. Typically, the scan chains are arranged in patterns such that faulty data caused by a defect in the integrated circuit is captured by multiple scan chains. With some implementations of this type of testing, the testing circuits are built into the integrated circuit, and the circuit thus analyzes itself. This type of testing is referred to as Built-In Self Test (BIST).

With still other implementations of this type of testing, referred to as "deterministic testing," the values of the scan chains are loaded with preset data referred to as a test pattern. The value changes recorded by the scan chains are then downloaded from the integrated circuit to a test diagnostics tool, such as an Automatic Test Pattern Generation (ATPG) tool, for analysis. By analyzing the recordation of incorrect data at multiple locations using test patterns and the design information for the integrated circuit, the ATPG tool can identify a defect in the integrated circuit. Moreover, the ATPG tool can localize the defect to a particular subset of the circuit, such as a specific block or net. Accordingly, this type of embedded testing thus can be used to determine the failure rate of a logical unit in a design corresponding to a specific portion of an integrated circuit.

Recent improvements in embedded deterministic testing have increased the speed at which testing can be performed. For example, the TestKompress and YieldAssist testing tools available from Mentor Graphics Corporation of Wilsonville, Oreg., create highly compressed test pattern sets, which may be up to 100 times smaller than the original size of the test pattern sets. These highly compressed test pattern sets are then input into the integrated circuit device from the ATPG tool just as with traditional embedded testing. A decompressor in the integrated circuit then expands the highly compressed patterns into fully specified patterns for delivery to a large number of internal scan chains. Once the pattern is delivered, the data from the scan chains may be captured using the exact same clocking sequence as conventional uncompressed ATPG testing, so that all fault models and pattern types that can be applied with uncompressed ATPG patterns can also be applied with EDT testing techniques. After the scan chains capture the specified circuit operation data, a compactor in the integrated circuit compresses the data as it is downloaded off of the integrated circuit out to the test tool. Thus, the EDT testing technique allows the integrated circuit to effectively run up to 100 times more test patterns within the same amount of testing time as a conventional ATPG test operation.

Figure 2:
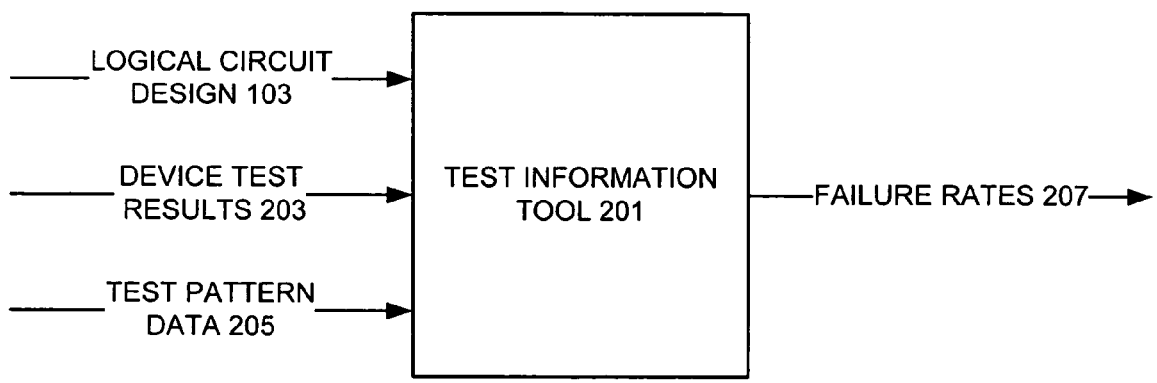
FIG. 2 illustrates an example of a test information tool that may be employed by various examples of the invention.

FIG. 2 illustrates one example of a test information tool 201 according to various examples of the invention. As will be appreciated from the foregoing discussion, this tool 201 may be implemented using, for example, an ATPG test tool. As seen in this figure, the tool 201 receives information 103 regarding the logical circuit design of an integrated circuit. It also receives device test results 203, which may be generated in response to test pattern data 205 configured from the logical circuit design information 103. In response, the test information tool 201 identifies when an integrated circuit portion corresponding to a logical unit of the integrated circuit design fails. From this, the testing information tool 201 can accumulate and provide failure rates 207 for integrated circuit portions corresponding to logical units.

It should be appreciated that the hierarchical level of a circuit design that can be tested using these embedded test techniques may depend upon the time available for testing. For example, in order to isolate a defect to a logical unit at a high hierarchical level, such as a block, the ATPG tool may need to download a hundred test patterns to control the operation of the scan chains during testing, and then download the scan chain data recorded from those test patterns. To isolate a defect to a logical unit at a lower hierarchical level, however, such as a netlist, the ATPG tool may need to download a several thousand test patterns to control the operation of the scan chains during testing, and then download the scan chain data recorded from those test patterns. While these EDT testing techniques have greatly improved the amount of tests patterns that can be run over a fixed period of time, testing speed may still determine the hierarchical level of the logical units employed by various examples of the invention. As previously noted, various examples of the invention analyze the failure rates of logical units based upon the test information available for those logical units. Thus, while it may be possible to measure the failure rates of logical units at lower hierarchical levels (e.g., cones of logical circuit elements that feed into particular gates), testing these lower hierarchical level logical units may still be too time consuming to determine the failure rates of these logical units for use by the invention. Also, it should be appreciated that the failure data for lower hierarchical units may not contain sufficient numbers of failures to be statistically useful. Thus, while a relatively high level hierarchical logical unit, such as a block, may have a statistically measurable failure rate, a lower level hierarchical unit, such as net, may fail so infrequently that its actual failure rate may be unmeasurable over even a relatively large testing population.

Still further, it should be appreciated that the failures may be "zero time" failures, which occur when the integrated circuit it first tested, or they may be post-packaging failures. The failures may also be failures that arise from reliability testing, or failures detected through statistical post processing. Also, with some examples of the invention, the failures may be complete (e.g., catastrophic) failures, while with still other examples of the invention, the failures may include even partial failures.

It also should be noted that, as used herein, the term failure rate refers to any criteria that measures the success or failure of an integrated circuit portion or a logical unit corresponding to an integrated circuit portion. Thus, in addition to literally referring to the ratio of defective integrated circuits per total number of integrated circuits manufactured, the term failure rate used herein also encompasses a yield rate (i.e., the number of non-defective integrated circuits per total number of integrated circuits manufactured). Thus, as will be appreciated by those of ordinary skill in the art, various examples of the invention may substitute a yield rate for a failure rate in any process, tool or dataset described herein.

Operating Environment

Figure 3:
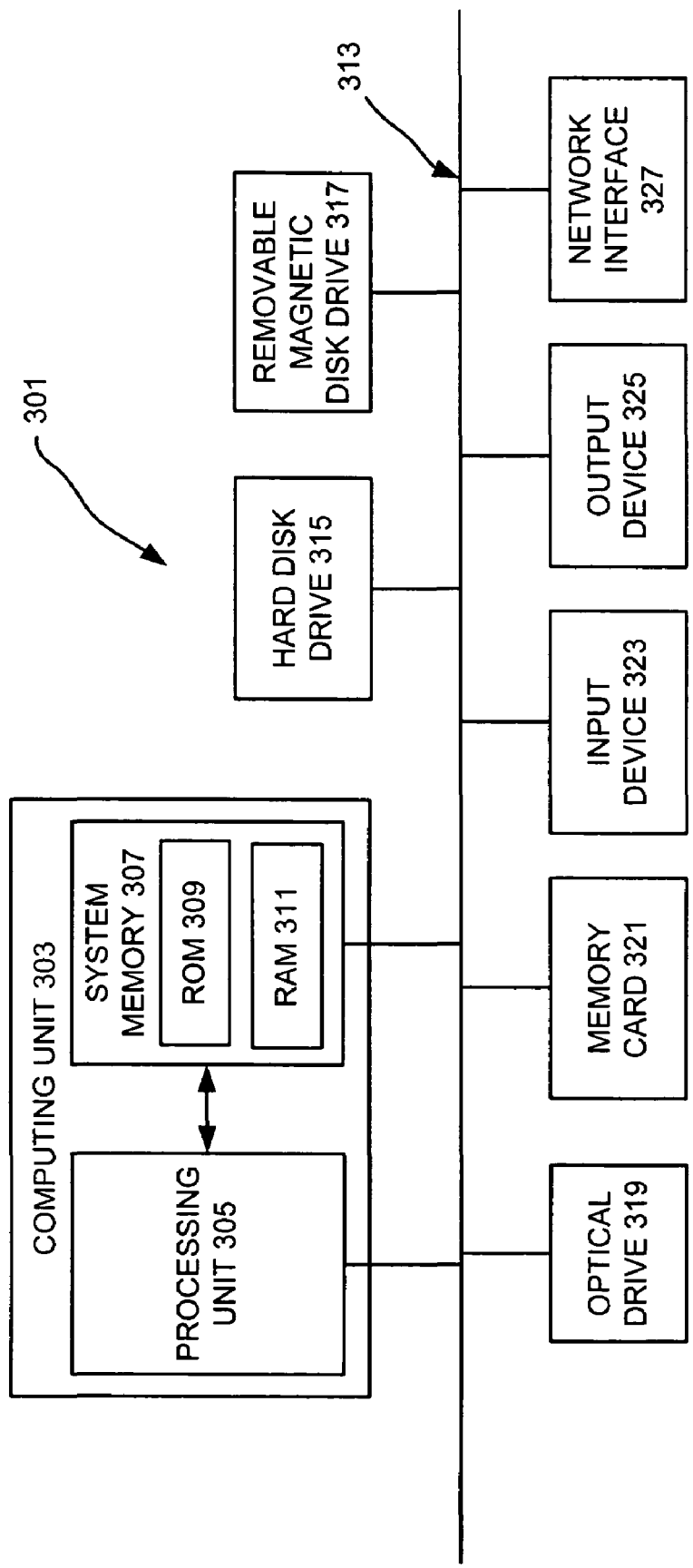
FIG. 3 illustrates an example of a computer device that may be used to implement various examples of the invention.

Some examples of the invention may be implemented using analog or configured digital circuitry. As will be apparent from the following description of the invention, however, various embodiments of the invention will be more typically embodied by a programmable computing device or a combination of programmable computing devices cooperating together, such as over a network. Accordingly, an illustrative example of such a computing device 301 therefore is shown in FIG. 3. As seen in this figure, the computing device 301 has a computing unit 303. The computing unit 303 typically includes a processing unit 305 and a system memory 307. The processing unit 305 may be any type of processing device for executing software instructions, but will conventionally be a microprocessor device. The system memory 307 may include both a read-only memory (ROM) 309 and a random access memory (RAM) 311. As will be appreciated by those of ordinary skill in the art, both the read-only memory (ROM) 309 and the random access memory (RAM) 311 may store software instructions for execution by the processing unit 305.

The processing unit 305 and the system memory 307 are connected, either directly or indirectly, through a bus 313 or alternate communication structure, to one or more peripheral devices. For example, the processing unit 305 or the system memory 307 may be directly or indirectly connected to one or more additional memory storage devices, such as a hard disk drive 315, a removable magnetic disk drive 317, an optical disk drive 319, or a flash memory card 321. The processing unit 305 and the system memory 307 also may be directly or indirectly connected to one or more input devices 323 and one or more output devices 325. The input devices 323 may include, for example, a keyboard, a pointing device (such as a mouse, touchpad, stylus, trackball, or joystick), a scanner, a camera, and a microphone. The output devices 325 may include, for example, a monitor display, a printer and speakers.

With some implementations, the computing unit 303 may be directly or indirectly connected to one or more network interfaces 327 for communicating with a network. The network interface 327 translates data and control signals from the computing unit 303 into network messages according to one or more communication protocols, such as the transmission control protocol (TCP) and the Internet protocol (IP). These protocols are well known in the art, and thus will not be discussed here in more detail. An interface 327 may employ any suitable connection agent (or combination of agents) for connecting to a network, including, for example, a wireless transceiver, a modem, or an Ethernet connection.

It should be appreciated that one or more of these peripheral devices may be housed with the computing unit 303 and bus 313. Alternately or additionally, one or more of these peripheral devices may be housed separately from the computing unit 303 and bus 313, and then connected (either directly or indirectly) to the bus 313. Also, it should be appreciated that both computers and computing appliances may include any of the components illustrated in FIG. 3, may include only a subset of the components illustrated in FIG. 3, or may include an alternate combination of components, including some components that are not shown in FIG. 3.

Feature Failure Correlation

Figure 4:
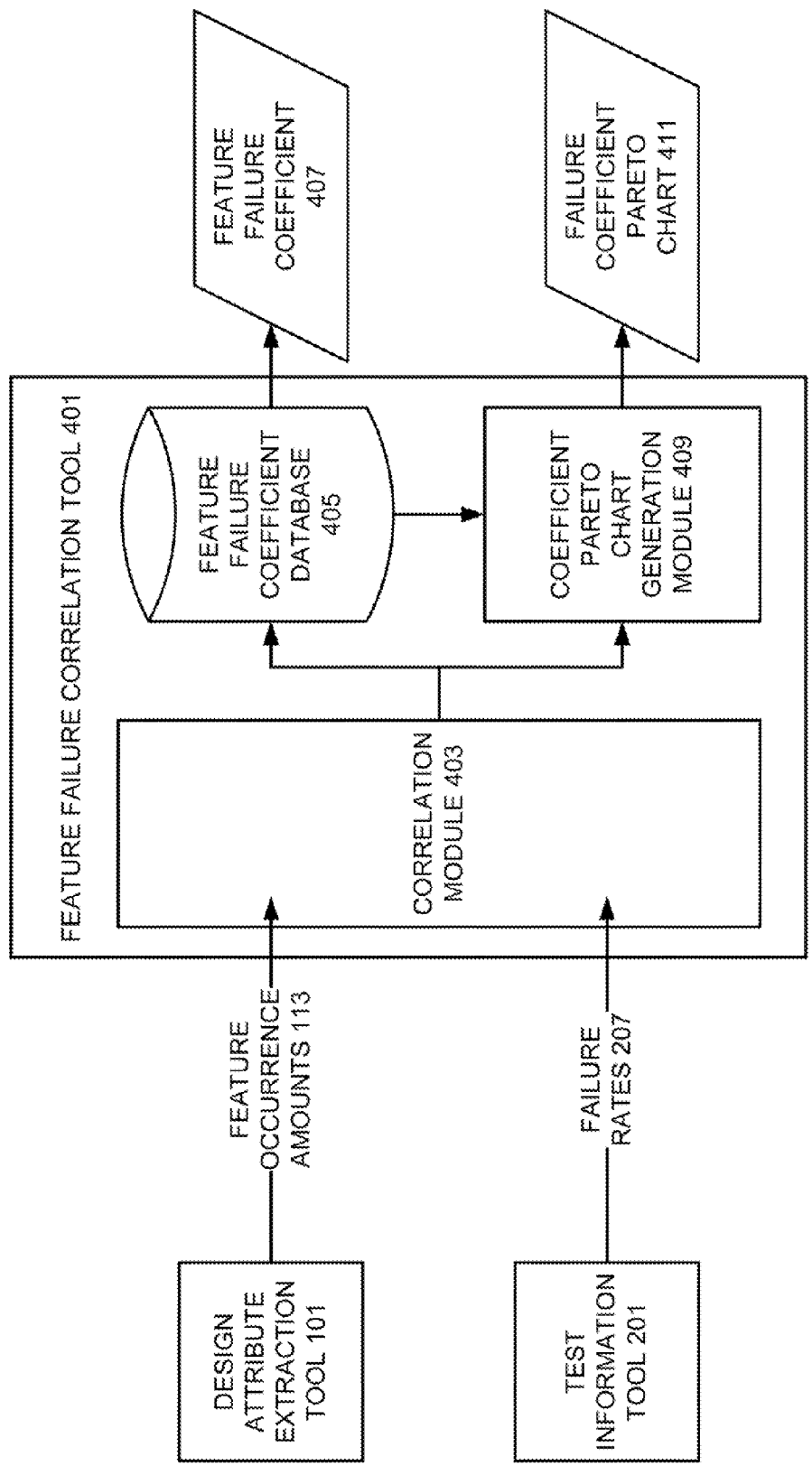
FIG. 4 illustrates a feature failure correlation tool according to various examples of the invention.
Figure 5A:
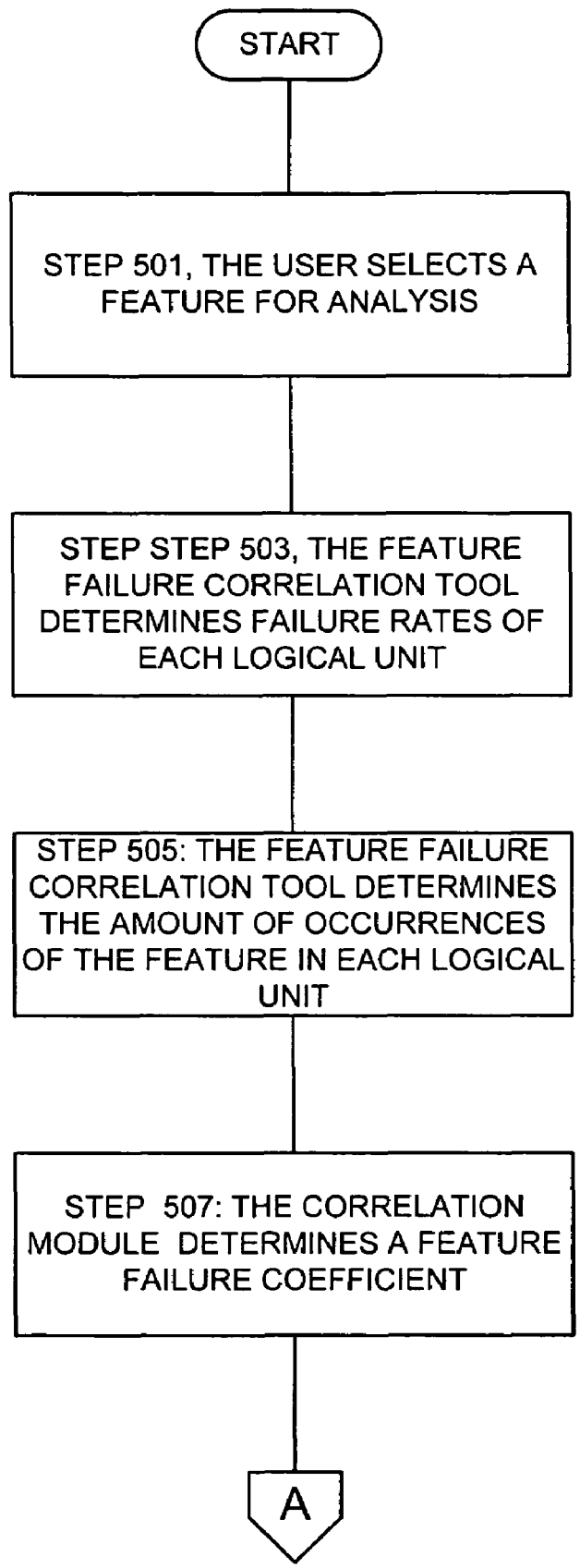
FIGS. 5A and 5B illustrate flowcharts describing the operation of a feature failure correlation tool according to various examples of the invention.
Figure 5B:
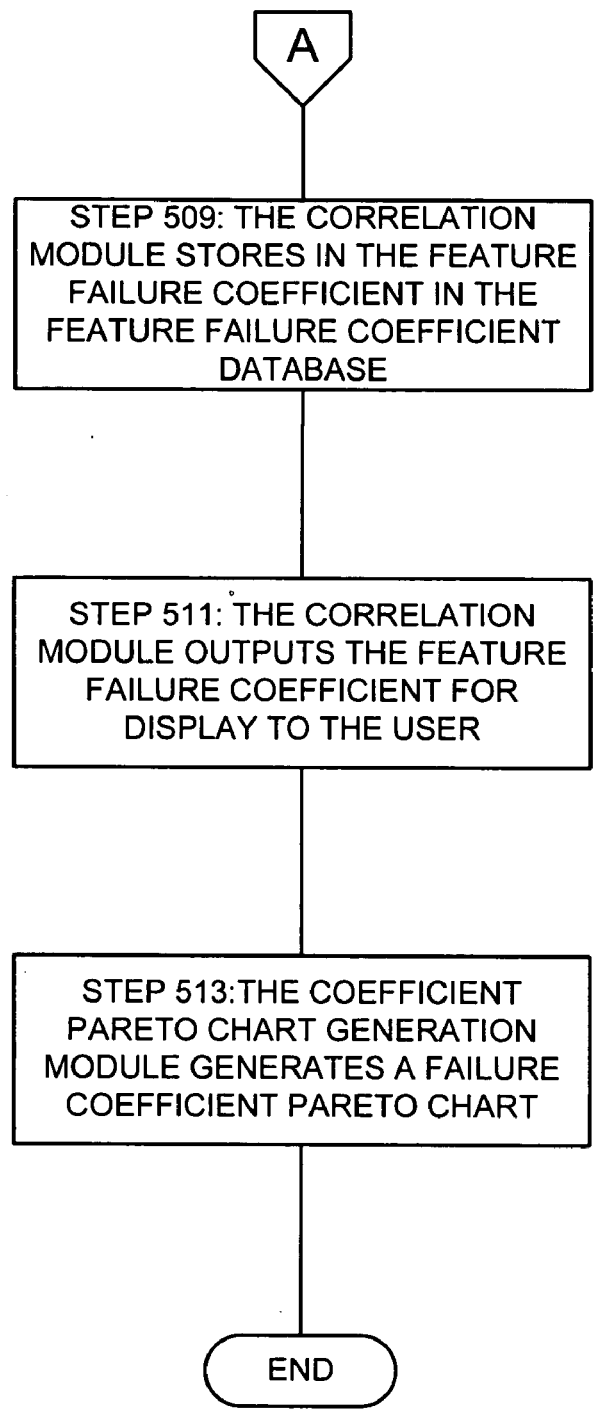

FIG. 4 illustrates an example of a feature failure correlation tool 401 that may be implemented according to various examples of the invention. As seen in this figure, the feature failure correlation tool 401 includes a correlation module 403 and a feature failure coefficient database 405 that together output a feature failure coefficient 407. With various examples of the invention, the feature failure correlation tool 401 will optionally also include a coefficient Pareto chart generation module 409, which provides a failure coefficient Pareto chart. The operation of the feature failure correlation tool 401 will be described with reference to the flowcharts illustrated in FIGS. 5A-5C.

Initially, in step 501, the user selects a feature for analysis. As previously noted, one of ordinary skill in the art will be aware of various structures, such as small vias and long conductive wires, that are more likely to cause defects than other structures. Accordingly, the user will specify a design feature defining a structure that has a relatively high likelihood of failure. Next, in step 503, the feature failure correlation tool 401 determines failure rates 207 for various circuit portions corresponding to logical units. As discussed in detail above, these failure rates 207 (which may be expressed in the form of yield rates) can be determined by obtaining them from a test information tool 201, such as an ATPG tool. As also noted above, the integrated circuit portion failure rates may correspond to logical units from a variety of different integrated circuit designs.

In step 505, the feature failure correlation tool 401 determines which of the logical units incorporate the specified feature, and the amount of occurrences of the feature in each logical unit. Again, these feature occurrence amounts 113 (which inherently identify those logical units incorporating the specified feature) may be determined by obtaining this information from a design attribute extraction tool 101, as described in detail above.

Then, in step 507, the correlation module 403 correlates the determined failure rates (which may be expressed as yield rates) against the amount of occurrences of the feature, to determine one or more feature failure coefficients 407 for the specified feature. More particularly, the correlation module 403 will determine a feature failure function f that best satisfies the equation (1) below:

$$\text{failure rate} = f(x),$$

where f is a function defined by one or more feature failure coefficients, and x is the amount of occurrences of the feature. With various examples of the invention, the correlation module 403 may be implemented using, for example, a conventional statistical analysis software application running on a conventional computer device.

Figure 6:
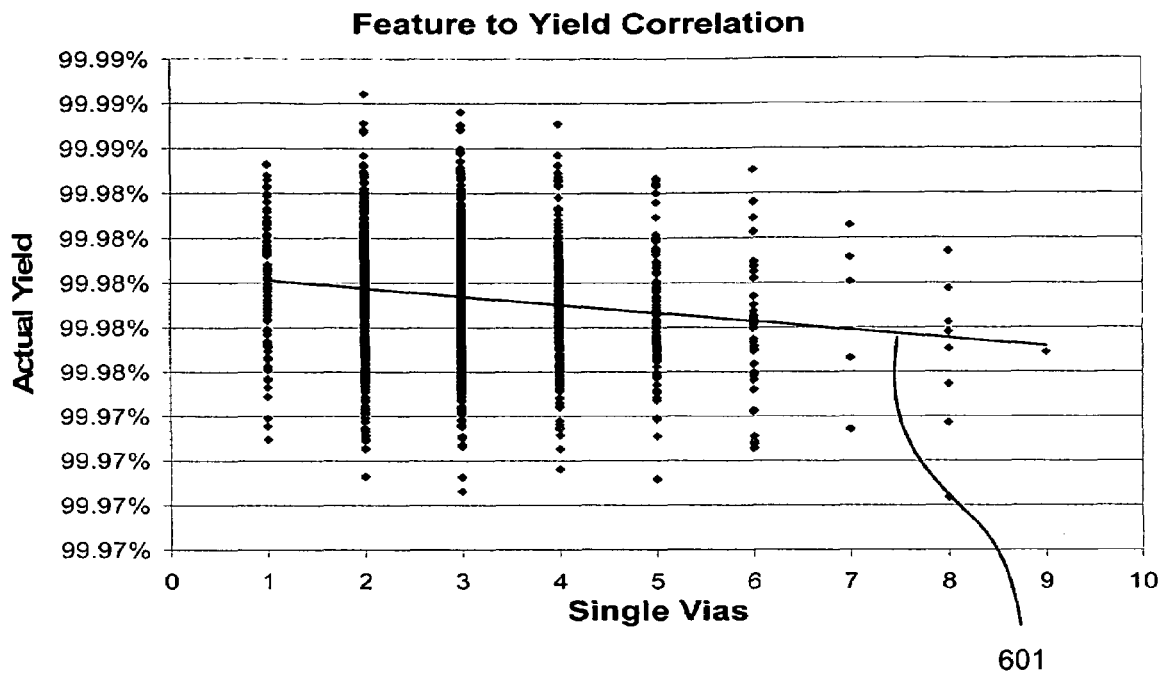
FIGS. 6 and 7 illustrate examples of feature-to-yield correlation charts of the type that may be produced by various examples of the invention.
Figure 7:
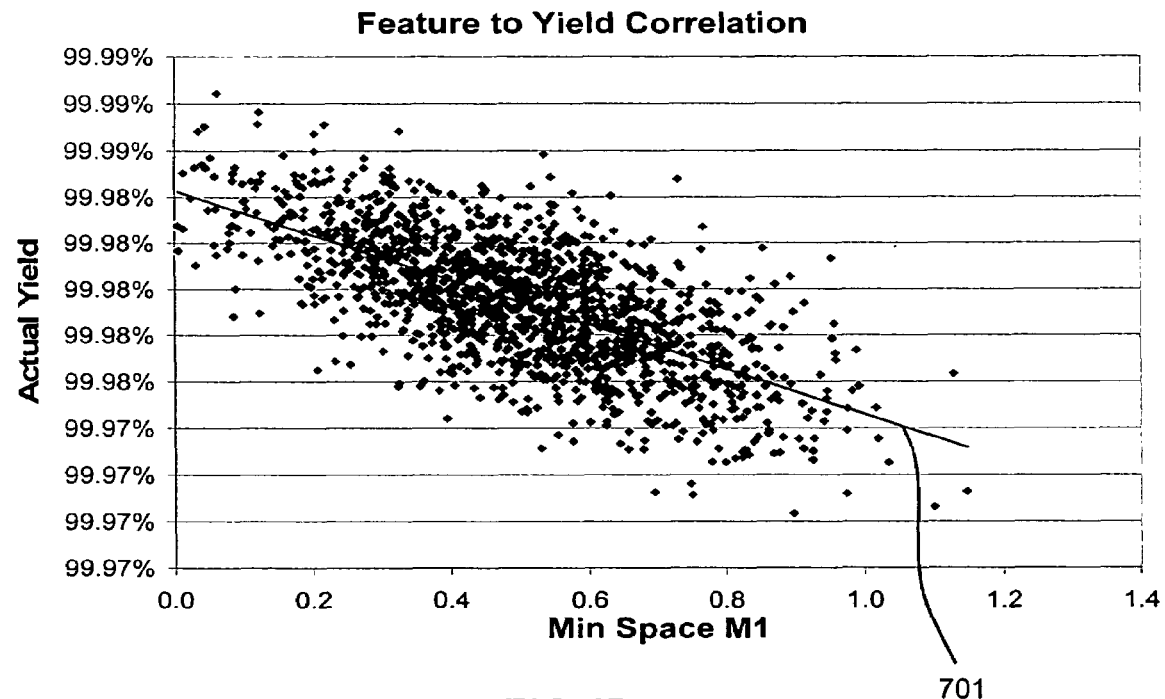

FIGS. 6 and 7 illustrate graphs showing examples of this correlation process. In particularly, FIG. 6 illustrates a correlation line 601 calculated by correlating the yield rates for logical units with the number of vias incorporated in the logical unit. The slope of the correlation line 601 corresponds to a linear fit of the graphed data points that represents the approximate failure rate of each feature. The spread in the data points from the line 601 is caused by the yield impact of all the other failure mechanisms in each logical unit. Similarly, FIG. 7 illustrates a correlation line 701 calculated by correlating the yield rates of logical units with a minimum distance between two lines (i.e., the feature is two adjacent wiring lines, and the amount of the feature is measured by the distance between the two lines).

While these examples illustrate a feature failure function and coefficient that provides a linear fit, it should be appreciated that the feature failure function may have coefficients that may have any type of fit mandated by the obtained data points. Thus, in the illustrated example, the feature failure coefficient takes a form so that equation (1) defines a straight line. With other failure rate and occurrence amount data sets, however, the feature failure function may be exponential, logarithmic, or any other function required to best fit the data points for the failure rates and amount of feature occurrences. Similarly, the function may be defined by one or more feature failure coefficients that may have a more complex form, such as "$x^n$," "$(x-n)$", etc. as appropriate.

In step 509, the correlation module 403 stores the feature failure coefficient 407 in the feature failure coefficient database 405 for future reference. Also, in step 511, the correlation module 403 may optionally output the feature failure coefficient 407 for display to the user. Alternately or additionally, other information regarding the process may be provided to the user as desired, such fitting curves of the type illustrated in FIGS. 6 and 7. Steps 501 and 505-509 are then repeated for each feature selected by a user. Advantageously, however, the failure rate information obtained in step 503 can continue to be used for new features.

Table 1 shows an example of the type of data that can be created by various examples of the invention. Each row represents the data for a given logical unit within the design. In this example, the logical unit is a net. The first group of columns for each net contains the statistics about various design features contained on those nets, such as the number of single vias, the lengths of conductive lines, and the distance between conductive lines. The "Actual Yield" column on the right hand side of the table then represents the yield of each net calculated over a large statistical sample of production test data using compressed embedded test scan diagnostics, as discussed in detail above.

TABLE 1

Net statistics database physical yield analysis.

| | | | | | |
|---|---|---|---|---|---|
| | | | | | |
| | | | mm | # | |
| # | mm | mm | Bridging Mechs | | |
| Open Mechanisms | | | Min | Min | % |
| NetName | Single Vias | Length M1 | Length M2 | Space M1 | Space M1-45 | Actual Yield |
| N348342 | 2 | 3.72992 | 1.29073 | 0.70642 | 3 | 99.979% |
| N723000 | 5 | 2.41953 | 2.13749 | 0.55512 | 3 | 99.979% |
| N722774 | 4 | 4.54991 | 1.95610 | 0.52412 | 3 | 99.977% |
| N868686 | 2 | 4.81466 | 1.90007 | 0.26846 | 2 | 99.981% |
| N906825 | 3 | 0.82530 | 1.95039 | 0.44865 | 3 | 99.984% |
| N430501 | 2 | 0.24455 | 2.05877 | 0.72941 | 2 | 99.985% |
| N306671 | 2 | 3.05894 | 2.20033 | 0.25910 | 2 | 99.985% |
| N960836 | 3 | 3.19550 | 2.00096 | 0.24427 | 3 | 99.983% |
| N631146 | 2 | 3.50581 | 1.57913 | 0.48508 | 4 | 99.980% |
| N899470 | 4 | 1.33828 | 2.59918 | 0.39739 | 4 | 99.979% |
| N001955 | 2 | 4.36102 | 1.68437 | 0.41973 | 2 | 99.978% |
| N022249 | 2 | 4.39427 | 1.62443 | 0.66852 | 2 | 99.981% |
| N309851 | 3 | 2.48415 | 2.88285 | 0.72739 | 2 | 99.978% |
| N806446 | 3 | 3.83013 | 2.05903 | 0.63866 | 3 | 99.977% |
| N579008 | 2 | 4.16777 | 1.66266 | 0.55018 | 2 | 99.981% |
| N224536 | 4 | 5.04853 | 2.25012 | 0.55275 | 4 | 99.976% |
| N200866 | 5 | 4.38409 | 2.12106 | 0.45839 | 3 | 99.979% |
| N331473 | 2 | 2.59351 | 2.36975 | 0.50468 | 3 | 99.980% |

After the feature failure coefficient database 405 has stored multiple feature failure coefficients, then the coefficient Pareto chart generation model 409 may optionally employ this coefficient information to generate a failure coefficient Pareto chart 411 in step 513. As will be appreciated by those of ordinary skill in the art, the Pareto chart will display the relative sizes of the determined feature failure functions or their associated coefficients for different features. A designer can thus use the relative sizes of the feature failure functions for a given amount of a feature or their associated coefficients to determine which features in an integrated circuit design will have the biggest impact on the yield of integrated circuits manufactured from the design. Of course, other examples of the invention may alternately or additionally employ another type of display for indicating to a user the relative values of the determined feature failure coefficients.

Yield Reduction Feature Identification

Figure 8:
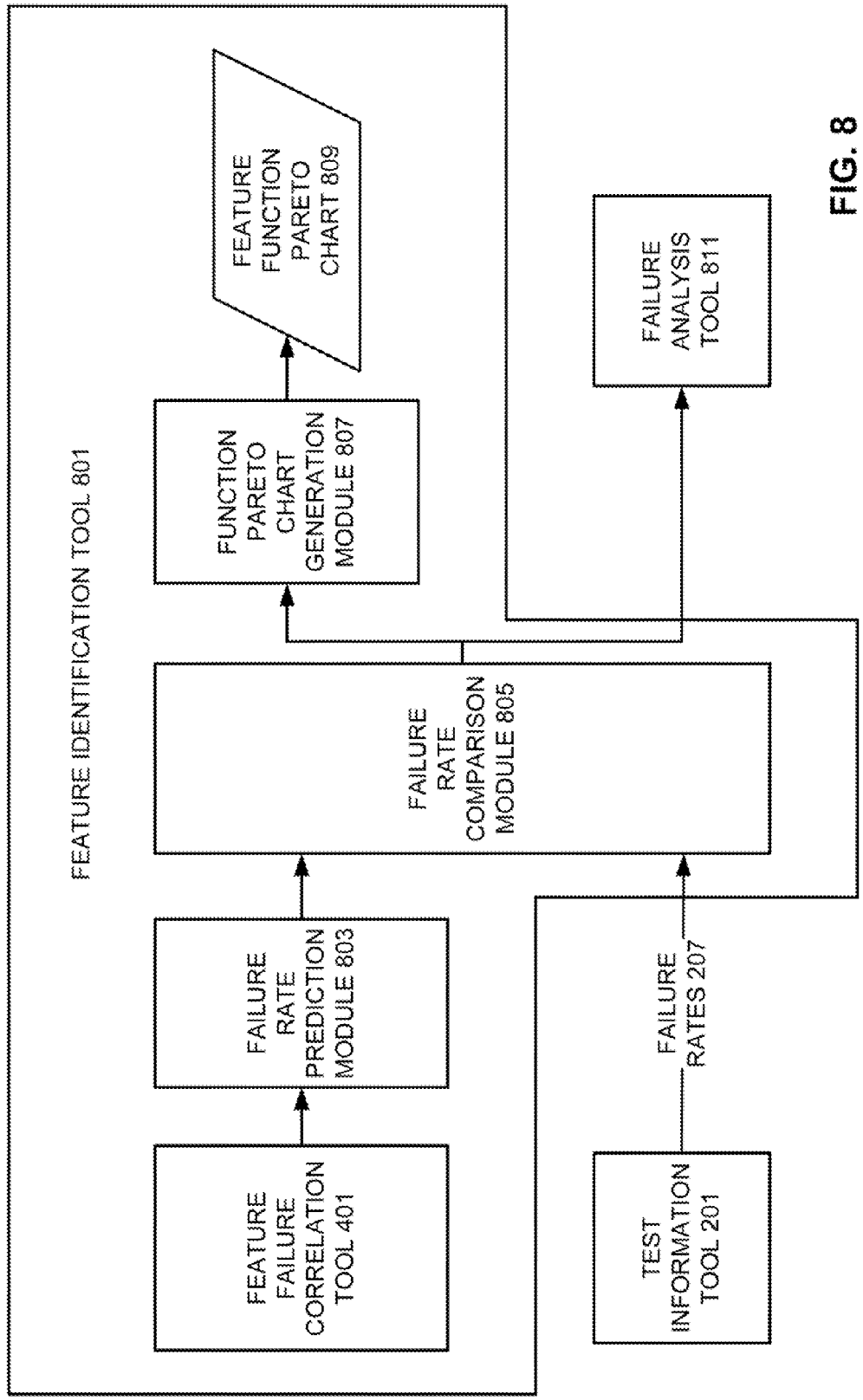
FIG. 8 illustrates a feature identification tool according to various examples of the invention.
Figure 9A:
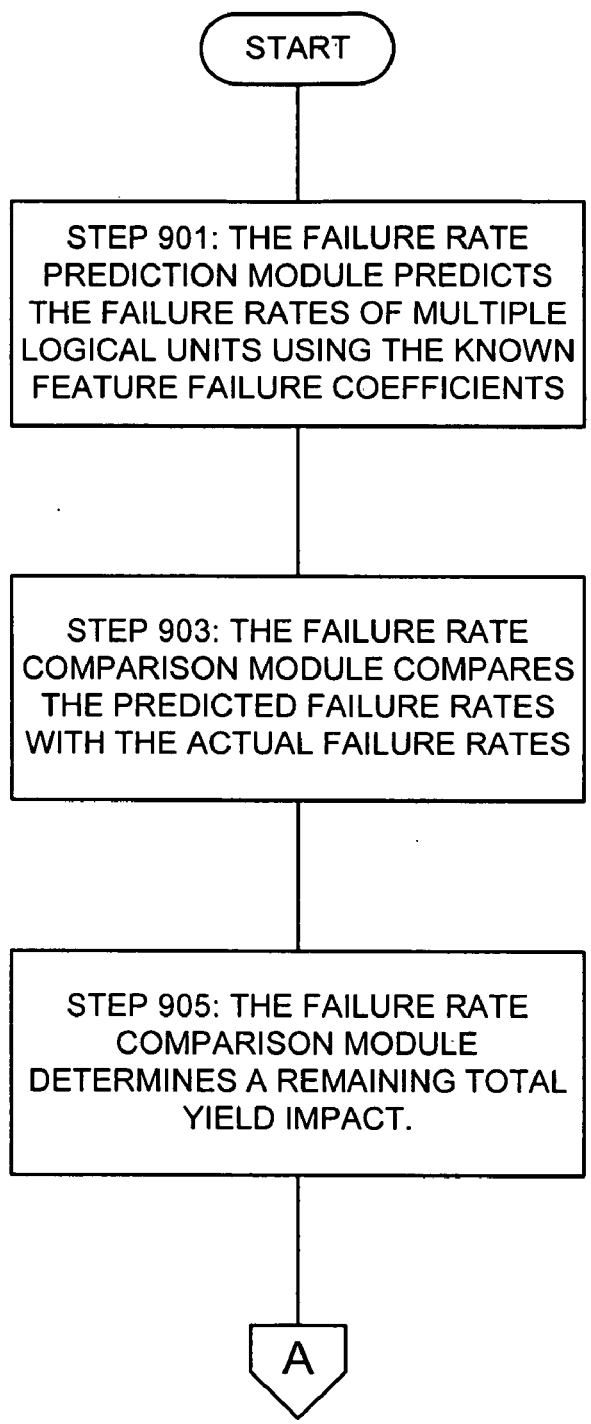
FIGS. 9A-9C illustrate flowcharts describing the operation of a feature identification tool according to various examples of the invention.
Figure 9B:
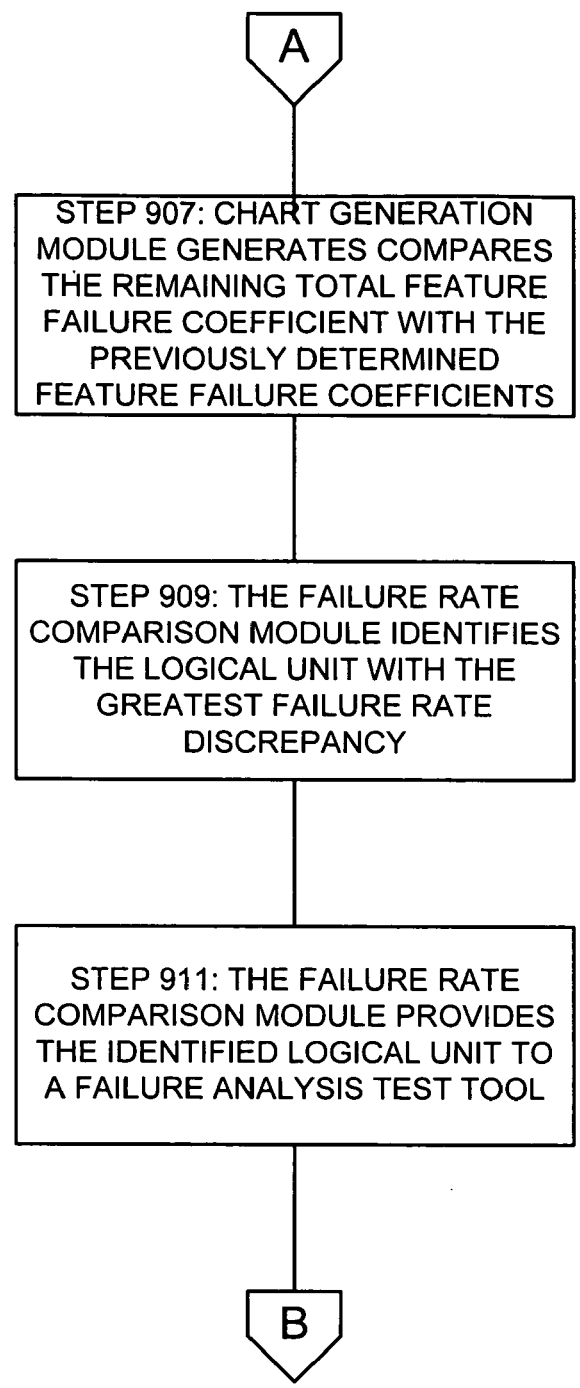
Figure 9C:
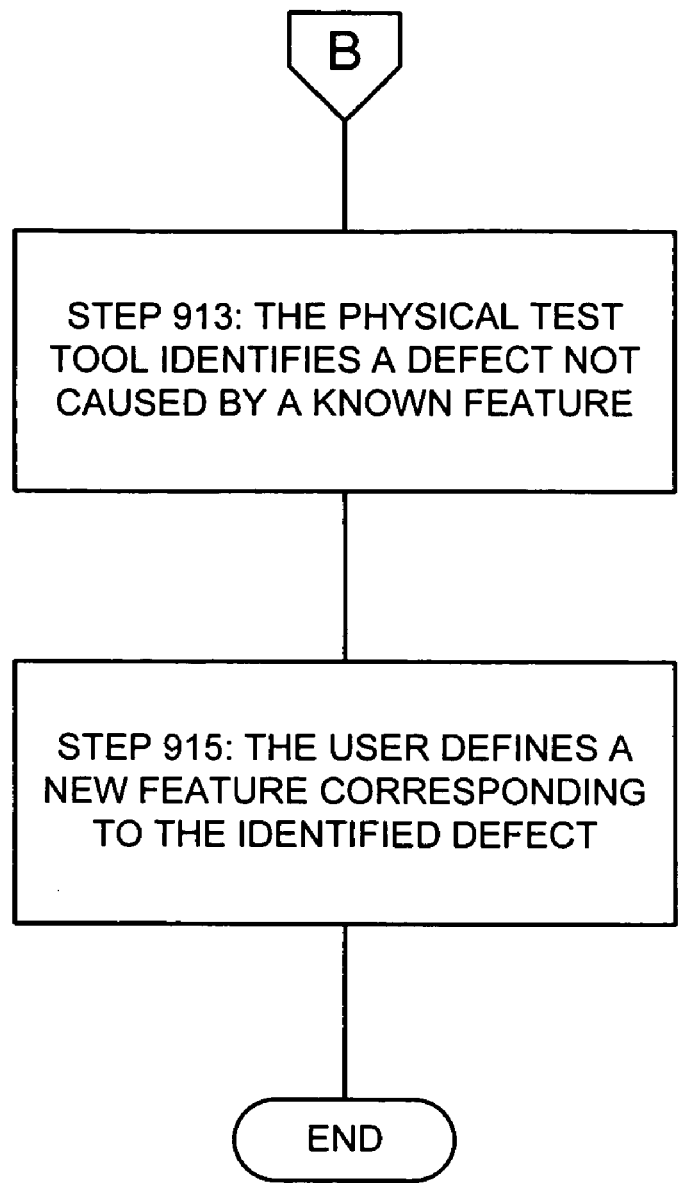

As previously discussed, in addition to determining the feature failure coefficients of known features, various embodiments of the invention may be employed to identify previously unknown design features that contribute to a reduction in yield of manufactured integrated circuits. FIG. 8 illustrates a feature identification tool 801 that may be implemented according to the invention to identify design features that have a significant impact on the yield of an integrated circuit. As seen in this figure, the feature identification tool 801 includes a feature failure correlation tool 401, as described in detail above. It also includes a failure rate prediction module 803, a failure rate comparison module 805, and a function Pareto chart generation module 807. The operation of this feature identification tool 801 will be described with reference to the flowcharts illustrated in FIGS. 9A-9C.

Initially, in step 901, the failure rate prediction module 803 uses the feature failure coefficients determined by the feature failure correlation tool 401 to predict the failure rates of multiple logical units based upon the occurrence amount of known features in those logical units. Thus, the failure rate prediction module 803 may determine a predicted failure rate for a logical unit based upon equation (2) below:

$$\text{predicted failure rate} = f_1(x_1) \ast f_2(x_2) \ast f_3(x_3) \ldots \ast f_n(x_n)$$

where $f_1$ is the feature failure function for a first feature occurring in the logical unit and $x_1$ is the amount of occurrences of the first feature in the logical unit, $f_2$ is the feature failure function for a second feature occurring in the logical unit and $x_2$ is the amount of occurrences of the second feature in the logical unit, etc. The predicted failure rate thus will have a predicted total failure rate.

Next, the failure rate comparison module 805 compares the predicted failure rates with the actual failure rates 205 obtained, for example, from a test information tool 201 as discussed in detail above. In particular, in step 903, the failure rate comparison module 805 divides the actual failure rates 207 by the predicted failure rate to determine a remaining total yield impact.

More particularly, the known feature failure coefficients are employed as a fit fail probability, as shown in Table 2 below. When multiplied by the design statistics for each logical unit (which, in the illustrated example is a net), these probabilities can be used to calculate a predicted yield for each logical unit. The delta between the predicted yield and the actual yield represents the impact of design features not yet identified by the invention.

TABLE 2

Failure probabilities and comparison of predicted yield with actual yield.

| | | | | Unit | | | | |
|---|---|---|---|---|---|---|---|---|
| | # | mm | mm | mm | # | % | % | % |
| Flt Fail Prob | 0.0004% | 0.0010% | 0.0009% | 0.0097% | 0.0010% | 77.94% | 69.08% | 8.86% |

| | | | | Bridging Mechs | | | | |
|---|---|---|---|---|---|---|---|---|
| | | Open Mechanisms | | Min | Min | | | |
| NetName | Single Vias | Length M1 | Length M2 | Space M1 | Space M1-45 | Predicted Yield | Actual Yield | Unknown |
| N348342 | 2 | 3.72992 | 1.29073 | 0.70642 | 3 | 99.984% | 99.979% | 0.005% |
| N723000 | 5 | 2.41953 | 2.13749 | 0.55512 | 3 | 99.985% | 99.979% | 0.007% |
| N722774 | 4 | 4.54991 | 1.95610 | 0.52412 | 3 | 99.984% | 99.977% | 0.007% |
| N868686 | 2 | 4.81466 | 1.90007 | 0.26846 | 2 | 99.988% | 99.981% | 0.007% |
| N906825 | 3 | 0.82530 | 1.95039 | 0.44865 | 3 | 99.989% | 99.984% | 0.005% |

From this data, the failure probabilities or yield impact of design layout features can be quantified to predict the yield of any design element by their feature statistics, as well as the remaining impact of unidentified design features (or relationships between design features). Thus, if the known features include all of the design features that will significantly impact the yield of integrated circuits during a manufacturing process, then the predicted total failure rate will closely correspond with or match the actual total failure rate. If, however, there are undiscovered design features that will impact the yield of manufactured integrated circuits, then the predicted total failure rate will not match the actual total failure rate. The difference between the actual total failure rate and the predicted total failure rate is determined in step 905 to be a remaining total yield impact. This remaining total feature yield impact may be ascribed to a feature failure function of a single unknown feature, or it may be ascribed to feature failure functions associated with multiple unknown features.

Figure 10:
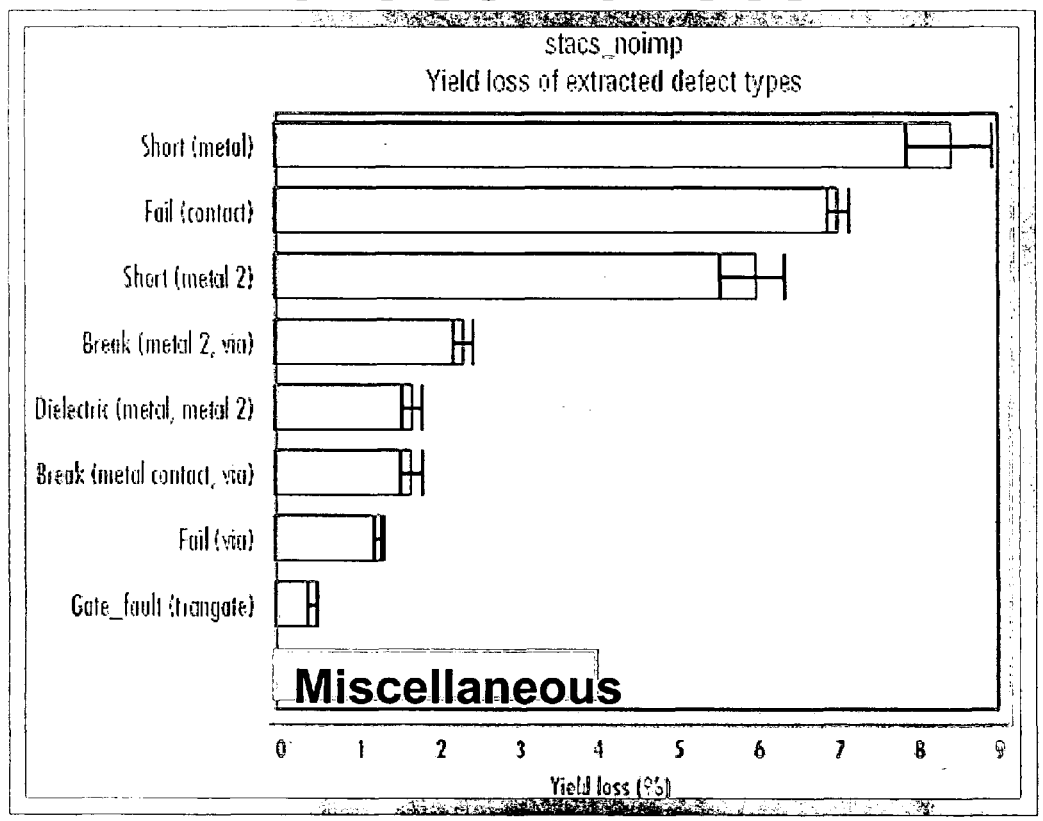
FIG. 10 illustrates an example of a Pareto chart that may be produced by a feature identification tool according to various examples of the invention.

In step 907, the coefficient Pareto chart generation module 807 generates a Pareto chart comparing the relative size of the remaining total yield impact with the previously determined feature failure functions corresponding to specified amounts of individual features. An example of this type of chart is illustrated in FIG. 10, where the remaining total yield impact is identified with the title "Miscellaneous." Using this chart, a user can determine whether the undiscovered feature or features has a sufficiently large impact on yield to warrant identifying that feature or features. For example, if the remaining total yield impact is above a threshold value, then the user may wish to identify the responsible feature or features.

If the user does decide to investigate the unknown feature or features, in step 909 the failure rate comparison module identifies the logical unit with the greatest failure rate discrepancy. As will be appreciated, this logical unit will be the one most likely to create a defect from an undiscovered feature. The identified logical unit may be provided, for example, to a failure analysis test tool 811 in step 911. The failure analysis test tool 811 can then physically examine samples of integrated circuit portions corresponding to the logical unit to identify a defect that was not caused by a previously specified feature. With various examples of the invention, the failure analysis test tool 811 may employ test information and feature failure coefficient information to narrow the physical search area for a defect that was not caused by a previously specified feature for that logical unit.

Eventually, the failure analysis test tool 811 will identify a defect that was not caused by a previously known feature in step 913. By examining this defect, the user can then specify the design feature that is responsible for creating the new defect in step 915. It should be noted that, in some instances, a newly identified feature may be a subset of a previously identified feature. For example, vias may have been a previously-identified feature with an associated known feature failure correlation. Upon examining circuit portions corresponding to a logical unit with a high failure rate discrepancy, however, it may be discovered that vias in proximity to connective lines of a given length are much more prone to failure than normal vias. Accordingly, the previously known feature of vias can be divided into two new features: normal vias and vias proximal to connective lines of a minimum length.

Once a new design feature has been specified, then the failure rate prediction module 805 can be used to determine the feature failure coefficient for this newly-identified feature. In this manner, steps 901-915 can be repeated until the remaining total yield impact falls below a desired threshold.

Refinement of Correlation Process

While various techniques and tool that may be implemented according to the invention have been described in detail above, it should be appreciated that there are additional refinements of these techniques and tools that may be obtained by using detailed test information. For example, in addition to simply identifying a failure of an integrated circuit portion corresponding to a logical unit, the test information may additionally identify the mode of the failure. For example, the test information may indicate that the failure mode for a logical unit was an open break in a connection, rather than a short between two connections.

This failure mode information can be used to more accurately obtain a feature failure coefficient for a feature by reducing correlation "noise" associated with irrelevant test information. More particularly, some features will be prone to a specific type of failure mode. For example, a long conductive wire will tend to fail through an open break in the wire, rather than by shorting to another wire. On the other hand, two adjacent wires will tend to fail through bridging between the two wires, rather than by an open break in either of the wires.

Accordingly, when determining the feature failure coefficient for conductive wires longer than a minimum length, failure rate information for non-open failure modes can be ignored. Instead, only the failure rates of failures created by an open will be correlated against the amount of occurrences of this feature. Similarly, when determining the feature failure coefficient for adjacent wires, failure rate information for non-bridge failure modes can be ignored, and only the failure rates of bridging failures need be correlated against the amount of occurrences of this feature. By eliminating the "noise" created by correlating the occurrences of a feature against the frequency of unrelated failure modes, the accuracy of the resulting feature failure correlation can be increased.

With still other examples of the invention, inductive fault modeling can be used to more accurately determine the likelihood of a structure in a particular electrical configuration impacting the yield of an integrated circuit. As noted above, failure rate information also may include failure modes for the detected failures. Conventional embedded testing methods, however, are limited to identifying failure modes outside of the gate level. That is, conventional embedded testing methods cannot detect a failure within a gate, such as a transistor within the gate being shorted to ground, but can instead only detect when a gate has produced an erroneous output.

Various examples of the invention may therefore employ inductive fault modeling to propagate a failure associated within one logical unit, where that failure cannot be diagnosed, to another logical unit where the failure can be diagnosed. For example, a short within a gate may produce the same erroneous output at a gate as an open break on a conductive wire outside of the gate. Accordingly, when the failure information indicates that failure has been caused by an open break on a conductive wire outside of the gate, then this failure also has to be associated with the feature that may have caused an undetectable short within the gate. In this manner, various embodiments of the invention can be used to determine the feature failure coefficient of features that cannot ordinarily be specifically detected by conventional embedded testing methodology.

Accordingly, the feature failure coefficient of each feature can be individually determined by correlating the occurrences of that feature against the failure rates for their common failure. In this manner, various embodiments of the invention can determine the likelihood that each feature will cause the noted failure. This technique can be used, for example, to determine that a failure previously associated with a break in a connective line outside of a gate is actually being caused by a defect created during the manufacture of a transistor within the gate. Advantageously, these embodiments of the invention can assist in identifying common gate level failures, such as problems in form active area poly, the gate oxide, and other structures that cannot be detected using conventional embedded testing techniques.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A computer-implemented method of determining a feature failure coefficient for an integrated circuit design feature, comprising:
   identifying a plurality of logical units in one or more integrated circuit designs;
   for each of the identified logical units,
       determining an amount of occurrences of an integrated circuit design feature in the logical unit, the integrated circuit design feature corresponding to a physical structure in an integrated circuit, and
       determining a failure rate of an integrated circuit portion corresponding to the logical unit; and
   correlating by a computer, the amounts of the occurrences of the integrated circuit design feature with the failure rates to determine at least one feature failure coefficient for the integrated circuit design feature.

2. The method recited in claim 1, wherein determining the amount of occurrences of the integrated circuit design feature in each of the logical units includes receiving the amount of occurrences of the integrated circuit design feature in each of the logical units from a design feature extraction tool.

3. The method recited in claim 1, wherein determining the failure rates of the integrated circuit portions corresponding to the logical units includes receiving the failure rates from a test information tool.

4. The method recited in claim 1, further comprising:
   determining that the at least one the feature failure coefficient for the integrated circuit design feature is above a threshold value; and
   reducing an amount of occurrences of the integrated circuit design feature in an existing integrated circuit design to produce a modified integrated circuit design.

5. A modified integrated circuit design produced using the method recited in claim 4.

6. The method recited in claim 1, wherein the logical units include logical units that have no occurrences of the integrated circuit design feature.

7. The method recited in claim 1, further comprising:
   determining that a probability that implementation of the integrated circuit design feature will cause an occurrence of the defect is above a threshold value; and
   adding test circuitry for occurrences of the integrated circuit design feature in an existing integrated circuit design to produce a modified integrated circuit design.

8. The method recited in claim 1, further comprising:
   determining that a probability that implementation of the integrated circuit design feature will cause an occurrence of the defect is above a threshold value; and
   producing a modified integrated circuit design by
       removing occurrences of the integrated circuit design feature from an existing integrated circuit design, and
       adding test circuitry for occurrences of the integrated circuit design feature that are not removed from the existing integrated circuit design.

9. The method recited in claim 1, wherein the logical units are identified from among a plurality of different integrated circuit designs.

10. The method recited in claim 1, further comprising determining a feature failure function incorporating the at least one feature failure coefficient.

11. The method recited in claim 1, wherein two or more of the logical units are at different hierarchical levels.

12. The method recited in claim 1, wherein each of the plurality of logical units incorporates an occurrence of the integrated circuit design feature.

13. The method recited in claim 1, further comprising receiving measurement criteria for determining the amount of occurrences of the integrated circuit design feature in each of the plurality of logical units.

14. The method recited in claim 13, wherein the measurement criteria is selected from the group consisting of: a number of discrete occurrences, a frequency, a length, an area, and a perimeter.

15. The method recited in claim 1, wherein the failure rate of each integrated circuit portion is based upon a failure mode corresponding to the integrated circuit design feature.

16. The method recited in claim 1, wherein the failure rate of each integrated circuit portion is based upon failures identified by inductive fault modeling.

17. The method recited in claim 1, further comprising:
defining a second integrated circuit design feature corresponding to a second physical structure;
for each of the identified logical units, determining an amount of occurrences of the second integrated circuit design feature in the logical unit, and
correlating the amounts of the occurrences of the second integrated circuit design feature with the failure rates to determine at least one feature failure coefficient for the second integrated circuit design feature.

18. The method recited in claim 17, further comprising employing the at least one feature failure coefficient for the first integrated circuit design feature and the at least one feature failure coefficient for the second integrated circuit design feature to produce a Pareto chart.

19. The method recited in claim 18, wherein the Pareto chart contrasts a failure rate associated with the first integrated circuit design feature against a failure rate associated with the second integrated circuit design feature.

20. A computer-readable medium containing computer-readable instructions for performing a method of determining a feature failure coefficient for an integrated circuit design feature, the method comprising:
defining an integrated circuit design feature corresponding to a physical structure in an integrated circuit;
identifying a plurality of logical units in one or more integrated circuit designs;
for each of the identified logical units,
determining an amount of occurrences of the integrated circuit design feature in the logical unit, and
determining a failure rate of an integrated circuit portion corresponding to the logical unit; and
correlating the amounts of the occurrences of the integrated circuit design feature with the failure rates to determine at least one feature failure coefficient for the integrated circuit design feature.

21. The computer-readable medium recited in claim 20, wherein the computer-executable instructions for determining the amount of occurrences of the integrated circuit design feature in each of the logical units include computer-executable instructions for receiving the amount of occurrences of the integrated circuit design feature in each of the logical units from a design feature extraction tool.

22. The computer-readable medium recited in claim 20, wherein the computer-executable instructions for determining the failure rates of the integrated circuit portions corresponding to the logical units include computer-executable instructions for receiving the failure rates from a test information tool.

23. The computer-readable medium recited in claim 20, further comprising computer-executable instructions for:
determining that the at least one feature failure coefficient for the integrated circuit design feature is above a threshold value; and
reducing an amount of occurrences of the integrated circuit design feature in an existing integrated circuit design to produce a modified integrated circuit design.

24. The computer-readable medium recited in claim 20, wherein the computer-executable instructions include computer-executable instructions for identifying logical units that include logical units having no occurrences of the integrated circuit design feature.

25. The computer-readable medium recited in claim 20, further comprising computer-executable instructions for:
determining that a probability that implementation of the integrated circuit design feature will cause an occurrence of the defect is above a threshold value; and
adding test circuitry for occurrences of the integrated circuit design feature in an existing integrated circuit design to produce a modified integrated circuit design.

26. The computer-readable medium recited in claim 20, further comprising computer-executable instructions for:
determining that a probability that implementation of the integrated circuit design feature will cause an occurrence of the defect is above a threshold value; and
producing a modified integrated circuit design by
removing occurrences of the integrated circuit design feature from an existing integrated circuit design, and
adding test circuitry for occurrences of the integrated circuit design feature that are not removed from the existing integrated circuit design.

27. The computer-readable medium recited in claim 20, wherein the computer-executable instructions for identifying a plurality of logical units in one or more integrated circuit designs include computer-executable instruction for identifying logical units from among a plurality of different integrated circuit designs.

28. The computer-readable medium recited in claim 20, wherein the computer-executable instructions further comprise instructions for determining a feature failure function incorporating the at least one feature failure coefficient.

29. The computer-readable medium recited in claim 20, wherein the computer-executable instructions for identifying a plurality of logical units in one or more integrated circuit designs include computer-executable instruction for identifying two or more of the logical units at different hierarchical levels.

30. The computer-readable medium recited in claim 20, wherein the computer-executable instructions for identifying a plurality of logical units in one or more integrated circuit designs include computer-executable instructions for identifying the plurality of logical units such that each of the plurality of logical units incorporates an occurrence of the integrated circuit design feature.

31. The computer-readable medium recited in claim 20, wherein the computer-executable instructions for determining an amount of occurrences of the integrated circuit design feature in the logical unit include computer-executable instructions for receiving measurement criteria for determining the amount of occurrences of the integrated circuit design feature in each of the plurality of logical units.

32. The computer-readable medium recited in claim 31, wherein the measurement criteria is selected from the group consisting of: a number of discrete occurrences, a frequency, a length, an area, and a perimeter.

33. The computer-readable medium recited in claim 20, wherein the failure rate of each integrated circuit portion is based upon a failure mode corresponding to the integrated circuit design feature.

34. The computer-readable medium recited in claim 20, wherein the failure rate of each integrated circuit portion is based upon failures identified by inductive fault modeling.

35. The computer-readable medium recited in claim 20, wherein the computer-executable instructions further comprise instructions for:

defining a second integrated circuit design feature corresponding to a second physical structure;

for each of the identified logical units, determining an amount of occurrences of the second integrated circuit design feature in the logical unit, and correlating the amounts of the occurrences of the second integrated circuit design feature with the failure rates to determine at least one feature failure coefficient for the second integrated circuit design feature.

36. The computer-readable medium recited in claim 35, wherein the computer-executable instructions further comprise instructions for employing the at least one feature failure coefficient for the first integrated circuit design feature and the at least one feature failure coefficient for the second integrated circuit design feature to produce a Pareto chart.

37. The computer-readable medium recited in claim 36, wherein the Pareto chart contrasts a failure rate associated with the first integrated circuit design feature against a failure rate associated with the second integrated circuit design feature.

38. A feature failure correlation tool, comprising:

a correlation module, configured to:

identify a plurality of logical units in one or more integrated circuit designs;

for each of the identified logical units, determine an amount of occurrences of the an integrated circuit design feature in the logical unit, the integrated circuit design feature corresponding to a physical structure in an integrated circuit, and determine a failure rate of an integrated circuit portion corresponding to the logical unit; and correlate the amounts of the occurrences of the integrated circuit design feature with the failure rates to determine at least one feature failure coefficient for the integrated circuit design feature.

39. The feature failure correlation tool recited in claim 38, further comprising a design feature extraction tool configured to provide the amount of occurrences of the integrated circuit design feature in each of the logical units.

40. The feature failure correlation tool recited in claim 38, further comprising a test information tool configured to provide the failure rates for determining the failure rates of the integrated circuit portions corresponding to the logical units.

41. The feature failure correlation tool recited in claim 38, wherein the correlation module is further configured to:

determine that the at least one feature failure coefficient for the integrated circuit design feature is above a threshold value; and reduce an amount of occurrences of the integrated circuit design feature in an existing integrated circuit design to produce a modified integrated circuit design.

42. The feature failure correlation tool recited in claim 38, wherein the correlation module is further configured to:

determine that a probability that implementation of the integrated circuit design feature will cause an occurrence of the defect is above a threshold value; and add test circuitry for occurrences of the integrated circuit design feature in an existing integrated circuit design to produce a modified integrated circuit design.

43. The feature failure correlation tool recited in claim 38, wherein the correlation module is further configured to:

determine that a probability that implementation of the integrated circuit design feature will cause an occurrence of the defect is above a threshold value; and produce a modified integrated circuit design by removing occurrences of the integrated circuit design feature from an existing integrated circuit design, and adding test circuitry for occurrences of the integrated circuit design feature that are not removed from the existing integrated circuit design.

44. The feature failure correlation tool recited in claim 38, wherein the correlation module is further configured to determine a feature failure function incorporating the at least one feature failure coefficient.

45. The feature failure correlation tool recited in claim 38, wherein the correlation module is further configured to receive measurement criteria for determining the amount of occurrences of the integrated circuit design feature in each of the plurality of logical units.

46. The feature failure correlation tool recited in claim 45, wherein the measurement criteria is selected from the group consisting of: a number of discrete occurrences, a frequency, a length, an area, and a perimeter.

47. The feature failure correlation tool recited in claim 38, wherein the correlation module is further configured to:

define a second integrated circuit design feature corresponding to a second physical structure;

for each of the identified logical units, determine an amount of occurrences of the second integrated circuit design feature in the logical unit, and correlate the amounts of the occurrences of the second integrated circuit design feature with the failure rates to determine at least one feature failure coefficient for the second integrated circuit design feature.

48. The feature failure correlation tool recited in claim 47, further comprising:

a coefficient Pareto chart generation module configured to employ the at least one feature failure coefficient for the first integrated circuit design feature and the at least one feature failure coefficient for the second integrated circuit design feature to produce a Pareto chart.

49. The feature failure correlation tool recited in claim 48, wherein the Pareto chart contrasts a failure rate associated with the first integrated circuit design feature against a failure rate associated with the second integrated circuit design feature.

50. The feature failure correlation tool recited in claim 47, further comprising:

a feature failure coefficient database configured to store the at least one feature failure coefficient determined by the correlation module.

* * * * *